US012624836B2

(12) United States Patent
Lim et al.

(10) Patent No.: US 12,624,836 B2
(45) Date of Patent: May 12, 2026

(54) COMBUSTOR NOZZLE, COMBUSTOR, AND GAS TURBINE INCLUDING SAME

(71) Applicant: DOOSAN ENERBILITY CO., LTD., Changwon (KR)

(72) Inventors: Joong Hyun Lim, Changwon (KR); Young Gun Go, Yongin (KR); Kyoung Taek Oh, Hwaseong (KR); Sang Pil Jo, Sejong (KR)

(73) Assignee: DOOSAN ENERBILITY CO., LTD, Changwon (KR)

( * ) Notice: Subject to any disclaimer, the term of this patent is extended or adjusted under 35 U.S.C. 154(b) by 0 days.

(21) Appl. No.: 18/914,056

(22) Filed: Oct. 12, 2024

(65) Prior Publication Data

US 2025/0180213 A1 Jun. 5, 2025

(30) Foreign Application Priority Data

Nov. 30, 2023 (KR) ........................ 10-2023-0171648

(51) Int. Cl.
*F23R 3/28* (2006.01)
*F23R 3/36* (2006.01)
*F23R 3/30* (2006.01)

(52) U.S. Cl.
CPC ................ *F23R 3/286* (2013.01); *F23R 3/36* (2013.01); *F05D 2270/17* (2013.01); *F23R 3/30* (2013.01)

(58) Field of Classification Search
CPC .................................. F23R 3/286; F23R 3/36
See application file for complete search history.

(56) References Cited

U.S. PATENT DOCUMENTS 3,078,672 A * 2/1963 Meurer ..................... F23R 3/30 60/39.23
3,142,961 A * 8/1964 Carlisle ..................... F23R 3/28 60/749
4,100,733 A 7/1978 Striebel
4,262,482 A 4/1981 Roffe
4,404,806 A * 9/1983 Bell, III .................. F23R 3/286 60/737
5,284,438 A * 2/1994 McGill ................... F23C 9/006 431/9
5,441,404 A * 8/1995 Christenson ............ F23D 14/22 431/350
(Continued)

FOREIGN PATENT DOCUMENTS

CN 214581225 U 11/2021
JP S60-82724 A 5/1985
(Continued)

OTHER PUBLICATIONS

The EP EESR, dated Mar. 28, 2025.

*Primary Examiner* — Ted Kim
(74) *Attorney, Agent, or Firm* — Harvest IP Law, LLP

(57) ABSTRACT

A combustor nozzle includes a plurality of mixing tubes through which air and fuel flow, an accommodation tube accommodating and supporting the plurality of mixing tubes therein, a first fuel tube coupled to the accommodation tube to supply a first fuel into the accommodation tube, a second fuel tube coupled to the accommodation tube to supply a second fuel into the accommodation tube, a first fuel supply member supplying the first fuel into each mixing tube, and a second fuel supply member supplying the second fuel into each mixing tube.

16 Claims, 11 Drawing Sheets

(56) References Cited

U.S. PATENT DOCUMENTS

| | | | | |
|---|---|---|---|---|
| 5,983,642 | A * | 11/1999 | Parker ..................... | F23R 3/286 60/737 |
| 8,438,851 | B1 * | 5/2013 | Uhm ....................... | F23R 3/286 60/737 |
| 8,850,821 | B2 * | 10/2014 | Khan ........................ | F23R 3/14 60/737 |
| 8,904,798 | B2 * | 12/2014 | Manoharan ............... | F23R 3/10 60/737 |
| 9,353,950 | B2 * | 5/2016 | Uhm ......................... | F23R 3/10 |
| 2010/0024426 | A1 | 2/2010 | Varatharajan | |
| 2010/0139280 | A1 | 6/2010 | Lacy | |
| 2010/0186413 | A1 | 7/2010 | Lacy | |
| 2011/0083439 | A1 | 4/2011 | Zuo | |
| 2013/0074510 | A1 | 3/2013 | Berry | |
| 2013/0104556 | A1 | 5/2013 | Uhm | |
| 2013/0232979 | A1 | 9/2013 | Singh | |
| 2013/0239581 | A1 | 9/2013 | Johnson | |

FOREIGN PATENT DOCUMENTS

| | | | |
|---|---|---|---|
| JP | 2011-080743 | A | 4/2011 |
| JP | 2013-190201 | A | 9/2013 |
| KR | 10-2016-0092939 | A | 8/2016 |
| KR | 101880673 | B1 | 7/2018 |
| KR | 10-1986729 | B1 | 6/2019 |
| KR | 20200027894 | A | 3/2020 |
| KR | 10-2403750 | B1 | 5/2022 |
| KR | 10-2459999 | B1 | 10/2022 |
| KR | 2023-0137107 | A | 10/2023 |

* cited by examiner

COMBUSTOR NOZZLE, COMBUSTOR, AND GAS TURBINE INCLUDING SAME

CROSS REFERENCE TO RELATED APPLICATION

The present application claims priority to Korean Patent Application No. 10-2023-0171648, filed on Nov. 30, 2023, the entire contents of which are incorporated herein for all purposes by this reference.

BACKGROUND

1. Technical Field

The present disclosure relates to a combustor nozzle, a combustor, and a gas turbine and, more particularly, to a combustor nozzle using hydrogen-containing fuel, a combustor, and a gas turbine including the same.

2. Description of the Related Art

A gas turbine is a combustion engine in which a mixture of air compressed by a compressor and fuel is combusted to produce a high temperature gas, which drives a turbine. The gas turbine is used to drive electric generators, aircraft, ships, trains, or the like.

The gas turbine generally includes a compressor, a combustor, and a turbine. The compressor serves to intake external air, compress the air, and transfer the compressed air to the combustor. The compressed air compressed by the compressor has a high temperature and a high pressure. The combustor serves to mix compressed air from the compressor and fuel and combust the mixture of compressed air and fuel to produce combustion gases, which are discharged to the turbine. The combustion gases drive turbine blades in the turbine to produce power. The power generated through the above processes is applied to a variety of fields such as generation of electricity, driving of mechanical units, etc.

Fuel is injected through nozzles disposed in respective combustors, wherein the fuel includes gaseous fuel and liquid fuel. In recent years, in order to minimize the emission of carbon dioxide, use of hydrogen fuel or a fuel containing hydrogen is recommended.

However, since hydrogen has a high combustion rate, when such fuels are burned with a gas turbine combustor, the flame formed in the gas turbine combustor approaches and heats the structure of the gas turbine combustor, thereby degrading the reliability of the gas turbine combustor.

To solve this problem, a combustor nozzle having multiple tubes has been proposed. The nozzle with multiple tubes is efficient for combustion of hydrogen by discharging fuel at a high speed. However, when hydrocarbon-based fuel such as natural gas is supplied to the multiple tubes, the fuel is injected at an excessively high speed, causing the flame to escape from the nozzle. As a result, the combustor with multiple tubes has the problem of not being able to burn a wide variety of fuels.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a combustor nozzle capable of burning a variety of fuels, not only hydrogen-based fuels, a combustor, and a gas turbine including the same.

An aspect of the present disclosure provides a combustor nozzle including: a plurality of mixing tubes through which air and fuel flow; an accommodation tube accommodating and supporting the plurality of mixing tubes therein; a first fuel tube coupled to the accommodation tube to supply a first fuel into the accommodation tube; a second fuel tube coupled to the accommodation tube to supply a second fuel into the accommodation tube; a first fuel supply member supplying the first fuel into each mixing tube; and a second fuel supply member supplying the second fuel into each mixing tube.

The combustor nozzle may further include: a tip plate coupled to a leading end of each accommodation tube; a middle plate spaced apart from the tip plate to define a first distribution space between the tip plate and the middle plate in which the first fuel is accommodated; and a rear plate spaced apart from the middle plate to define a second distribution space between the rear plate and the middle plate in which the second fuel is accommodated.

The first fuel supply member may be connected to the first distribution space, and the second fuel supply member may be connected to the second distribution space.

An outlet of the first fuel supply member may be disposed closer to the center of the mixing tube than an outlet of the second fuel supply member.

An outlet of the second fuel supply member may be located further downstream of the outlet of the first fuel supply member.

The second fuel supply member may extend from the second distribution space into the first distribution space and then into the mixing tube.

The second fuel supply member may form a concentrated fuel flow along an inner circumferential wall of the mixing tube.

The first fuel may include a hydrogen-based fuel having hydrogen as a major component or a hydrocarbon-based fuel having hydrocarbon as a major component, and the second fuel may include a hydrocarbon-based fuel having hydrocarbon as a major component.

The mixing tube may be provided with an auxiliary groove into which the outlet of the second fuel supply member is inserted to supply the second fuel to the auxiliary groove, wherein the auxiliary groove extends from a connection between the second fuel supply member and the mixing tube to a leading end of the mixing tube.

The second fuel supply member may be provided with a guide portion for injecting the second fuel toward the inner circumferential wall of the mixing tube.

Another aspect of the present disclosure provides a combustor including: a burner having a plurality of nozzles through which fuel and air are injected; and a duct assembly coupled to one side of the burner to allow the fuel and the air to be combusted therein and combustion gases to be transferred to a turbine, wherein the nozzle includes: a plurality of mixing tubes through which air and fuel flow; an accommodation tube accommodating and supporting the plurality of mixing tubes therein; a first fuel tube coupled to the accommodation tube to supply a first fuel into the accommodation tube; a second fuel tube coupled to the accommodation tube to supply a second fuel into the accommodation tube; a first fuel supply member supplying the first fuel into each mixing tube; and a second fuel supply member supplying the second fuel into each mixing tube.

The nozzle may further include: a tip plate coupled to a leading end of each accommodation tube, a middle plate spaced apart from the tip plate to define a first distribution space between the tip plate and the middle plate in which the first fuel is accommodated; and a rear plate spaced apart from the middle plate to define a second distribution space between the rear plate and the middle plate in which the second fuel is accommodated.

The first fuel supply member may be connected to the first distribution space, and the second fuel supply member may be connected to the second distribution space.

An outlet of the first fuel supply member may be disposed closer to the center of the mixing tube than an outlet of the second fuel supply member, and an outlet of the second fuel supply member may be located further downstream of the outlet of the first fuel supply member.

The second fuel supply member may extend from the second distribution space into the first distribution space and then into the mixing tube.

The second fuel supply member may form a concentrated fuel flow along an inner circumferential wall of the mixing tube.

The first fuel may include a hydrogen-based fuel having hydrogen as a major component or a hydrocarbon-based fuel having hydrocarbon as a major component, and the second fuel may include a hydrocarbon-based fuel having hydrocarbon as a major component.

The mixing tube may be provided with an auxiliary groove into which the outlet of the second fuel supply member is inserted to supply the second fuel to the auxiliary groove, wherein the auxiliary groove extends from a connection between the second fuel supply member and the mixing tube to a leading end of the mixing tube.

The second fuel supply member may be provided with a guide portion for injecting the second fuel toward the inner circumferential wall of the mixing tube.

A further aspect of the present disclosure provides a gas turbine including: a compressor compressing an externally introduced air; a combustor mixing the compressed air from the compressor with fuel to produce a mixture and combusting the mixture; and a turbine having a plurality of turbine blades rotated by the combustion gases from the combustor, wherein the combustor includes: a burner having a plurality of nozzles through which fuel and air are injected; and a duct assembly coupled to one side of the burner to allow the fuel and the air to be combusted therein and combustion gases to be transferred to a turbine, wherein the nozzle includes: a plurality of mixing tubes through which air and fuel flow; an accommodation tube accommodating and supporting the plurality of mixing tubes therein; a first fuel tube coupled to the accommodation tube to supply a first fuel into the accommodation tube; a second fuel tube coupled to the accommodation tube to supply a second fuel into the accommodation tube; a first fuel supply member supplying the first fuel into each mixing tube; and a second fuel supply member supplying the second fuel into each mixing tube.

As described above, the combustor nozzle, combustor and gas turbine according to the embodiments include the first fuel supply member and the second fuel supply member to supply different types of fuel into the mixing tubes to maintain a stable flame using hydrocarbon-based fuel as well as hydrogen.

In addition, since the flame is stabilized by the second fuel supplied from the second fuel supply member, occurrence of vibration and generation of carbon monoxide and nitrogen oxide may be easily controlled by controlling the flow rate of the first fuel supplied from the first fuel supply member.

DETAILED DESCRIPTION

Figure 1:
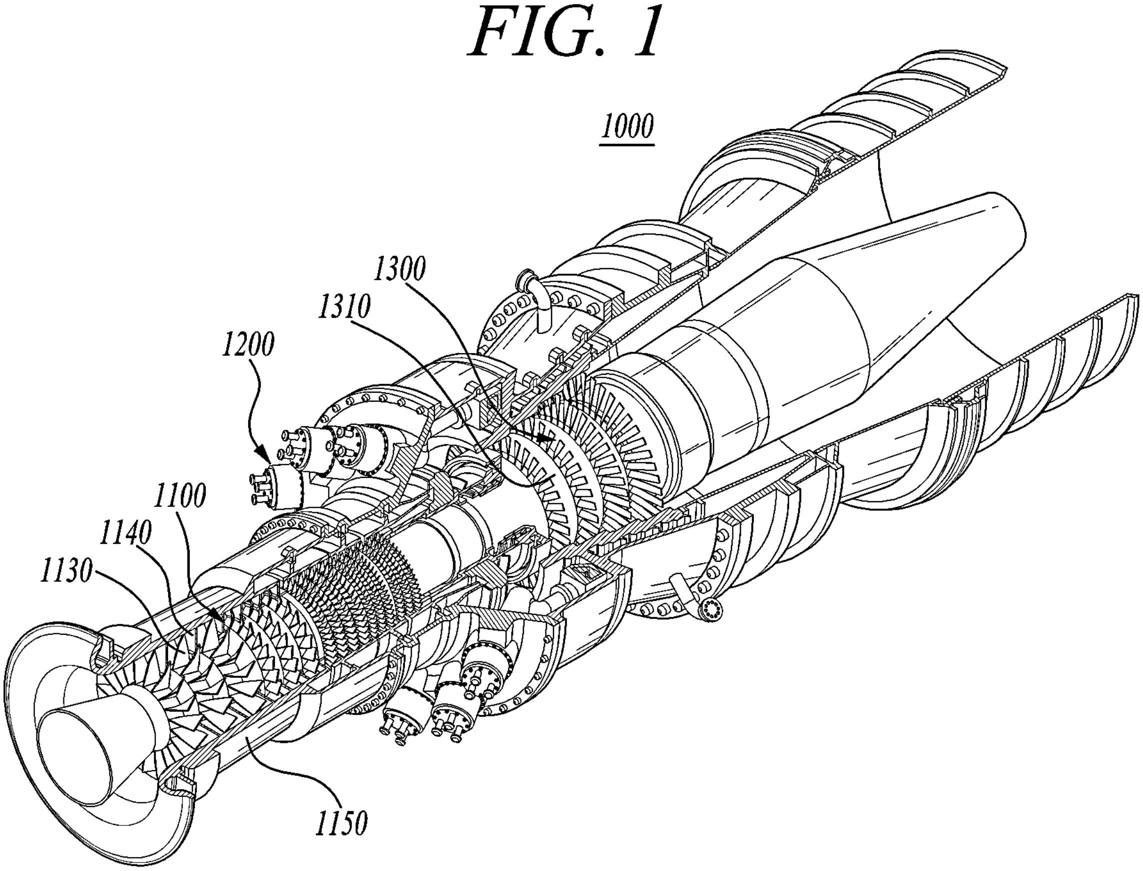
FIG. 1 is a diagram illustrating the interior of a gas turbine according to a first embodiment of the present disclosure.

Hereinafter, exemplary embodiments of the present disclosure will be described in detail with reference to the accompanying drawings. However, it should be noted that the present disclosure is not limited thereto, but may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the terms "comprising" or "including" specifies the presence of stated features, numbers, steps, operations, elements, parts, or combinations thereof, but does not preclude the presence or addition of one or more other features, numbers, steps, operations, elements, parts, or combinations thereof. Hereinafter, preferred embodiments of the present disclosure will be described in detail with reference to the accompanying drawings.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Hereinafter, a gas turbine according to a first embodiment of the present disclosure will be described.

Figure 2:
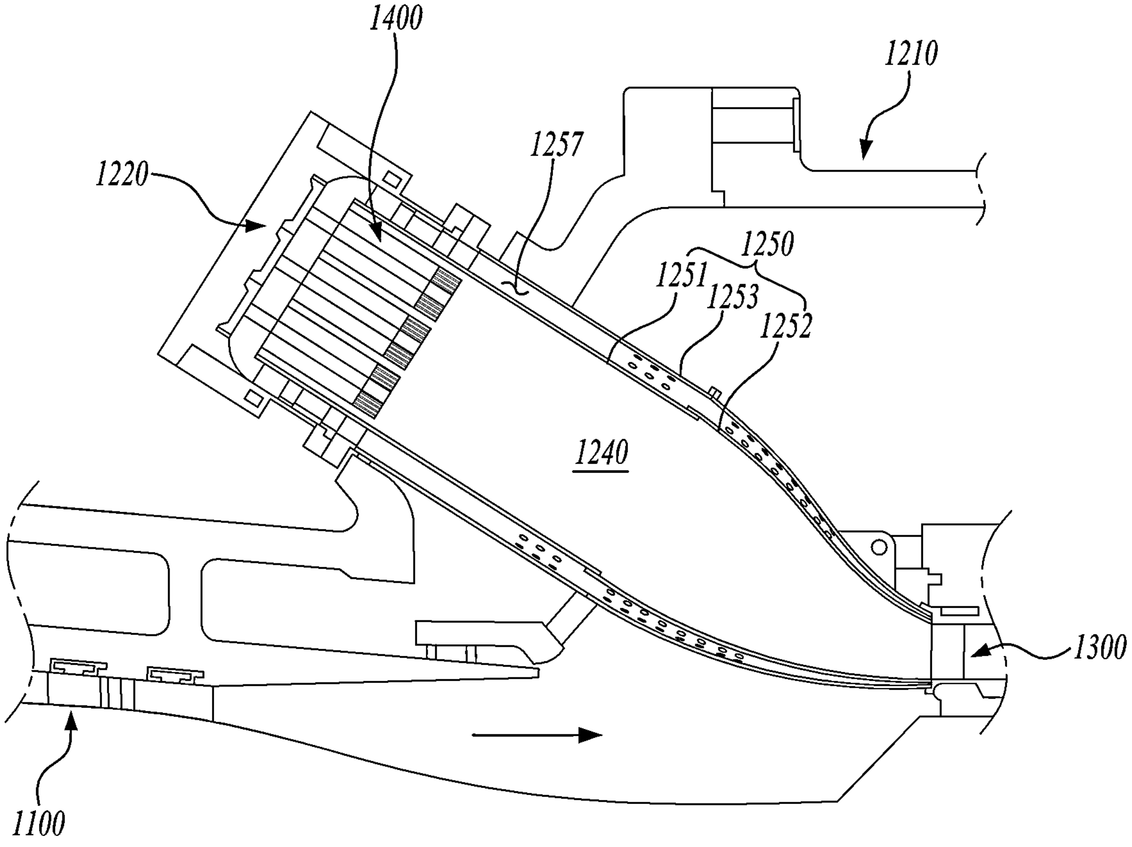
FIG. 2 is a cross-sectional diagram illustrating a combustor of FIG. 1.

FIG. 1 is a diagram illustrating the interior of a gas turbine according to a first embodiment of the present disclosure, and FIG. 2 is a cross-sectional diagram illustrating a combustor of FIG. 1.

An ideal thermodynamic cycle of a gas turbine 1000 according to the present embodiment follows a Brayton cycle. The Brayton cycle consists of four thermodynamic processes: isentropic compression (adiabatic compression), isobaric combustion, isentropic expansion (adiabatic expansion) and isobaric heat ejection. That is, in the Brayton cycle, atmospheric air is sucked and compressed into high pressure air, mixed gas of fuel and compressed air is combusted at constant pressure to discharge heat energy, heat energy of hot expanded combustion gas is converted into kinetic energy, and exhaust gases containing remaining heat energy is discharged to the outside. That is, gases undergo four thermodynamic processes: compression, heating, expansion, and heat ejection.

As illustrated in FIG. 1, the gas turbine 1000 employing the Brayton cycle includes a compressor 1100, a combustor 1200, and a turbine 1300. Although the following description will be described with reference to FIG. 1, the present disclosure may be widely applied to other turbine engines similar to the gas turbine 1000 illustrated in FIG. 1.

Referring to FIG. 1, the compressor 1100 of the gas turbine 1000 may suck and compress air. The compressor 1100 may serve both to supply the compressed air by compressor blades 1130 to a combustor 1200 and to supply the cooling air to a high temperature region of the gas turbine 1000. Here, since the sucked air undergoes an adiabatic compression process in the compressor 1100, the air passing through the compressor 1100 has increased pressure and temperature.

The compressor 1100 is usually designed as a centrifugal compressor or an axial compressor. The centrifugal compressor is applied to a small-scale gas turbine, whereas a multi-stage axial compressor is applied to a large-scale gas turbine 1000 illustrated in FIG. 1 since the large-scale gas turbine 1000 is required to compress a large amount of air. In this case, in the multi-stage axial compressor, the compressor blades 1130 of the compressor 1100 rotate according to the rotation of the rotor disks to compress the introduced air and move the compressed air to the compressor vanes 1140 on the rear stage. As the air passes through the compressor blades 1130 formed in multiple stages, the air is compressed to a higher pressure.

The compressor vanes 1140 are mounted inside the housing 1150 in stages. The compressor vanes 1140 guide the compressed air moved from the front side compressor blades 1130 toward the rear-side compressor blades 1130. In one embodiment, at least some of the compressor vanes 1140 may be mounted so as to be rotatable within a predetermined range for adjustment of an air inflow, or the like.

The compressor 1100 may be driven using a portion of the power output from the turbine 1300. To this end, as illustrated in FIG. 1, the rotary shaft of the compressor 1100 and the rotary shaft of the turbine 1300 may be directly connected. In the case of the large-scale gas turbine 1000, almost half of the output produced by the turbine 1300 may be consumed to drive the compressor 1100. Accordingly, improving the efficiency of the compressor 1100 has a direct effect on improving the overall efficiency of the gas turbine 1000.

The turbine 1300 includes a rotor disk 1310 and a plurality of turbine blades and turbine vanes radially disposed on the rotor disk 1310. The rotor disk 1310 has a substantially disk shape on which a plurality of grooves is formed. The grooves are formed to have curved surfaces, and turbine blades are inserted into the grooves. The turbine vanes are fixed at a casing of the turbine against rotation and guide a flow of combustion gases through the turbine blades. The turbine blades are rotated by combustion gases to generate rotational force.

On the other hand, the combustor 1200 serves to mix the compressed air supplied from an outlet of the compressor 1100 with fuel and combust the mixture at constant pressure to produce hot combustion gases. FIG. 2 illustrates an example of the combustor 1200 provided in the gas turbine 1000. The combustor 1200 may include a combustor casing 1210, burners 1220, nozzles 1400, and a duct assembly 1240.

The combustor casing 1210 may have a substantially circular shape in which the burners 1220 are surrounded. The burners 1220 are disposed downstream of the compressor 1100 and may be disposed along the annular combustor casing 1210. Each burner 1220 is provided with a plurality of nozzles 1400, and fuel injected from the nozzles 1400 is mixed with air in an appropriate ratio to achieve a suitable state for combustion.

The gas turbine 1000 may use a gas fuel, in particular, a fuel containing hydrogen. The fuel may include a hydrogen fuel alone or a fuel containing hydrogen and natural gas.

The duct assembly 1250 is provided to connect the burners 1220 and the turbine 1300 so that the hot combustion gas flows to the turbine 1300 therethrough. During the flow of the hot combustion gas through the duct assembly 1250, the duct assembly is heated.

The duct assembly 1250 may include a liner 1251 and a transition piece 1252, and a flow sleeve 1253. The duct assembly 1250 has a double structure in which the flow sleeve 1253 surrounds the outside of the liner 1251 and the transition piece 1252. The compressed air penetrates into an annular space inside the flow sleeve 1253 and flows toward the nozzles 1400 along an outer surface of the liner 1251 and the transition piece 1252. During the flow of the compressed air in the annular space, the liner 1251 and the transition piece 1252 is cooled.

The liner 1251 is a tube member connected to the burners 1220 of the combustor 1200, wherein an internal space of the liner 1251 defines the combustion chamber 1240. A longitudinal one side of the liner 1251 is coupled to the burner 1220, and the other side of the liner 1251 is coupled to the transition piece 1252.

The transition piece 1252 is connected an inlet of the turbine 1300 to guide the hot combustion gas toward the turbine 1300. A longitudinal one side of the transition piece 1252 is coupled to the liner 1251, and the other side of the transition piece 1252 is coupled to the turbine 1300. The flow sleeve 1253 serves to protect the liner 1251 and the transition piece 1252 while avoiding direct exhaust of hot air to the outside.

Figure 3:
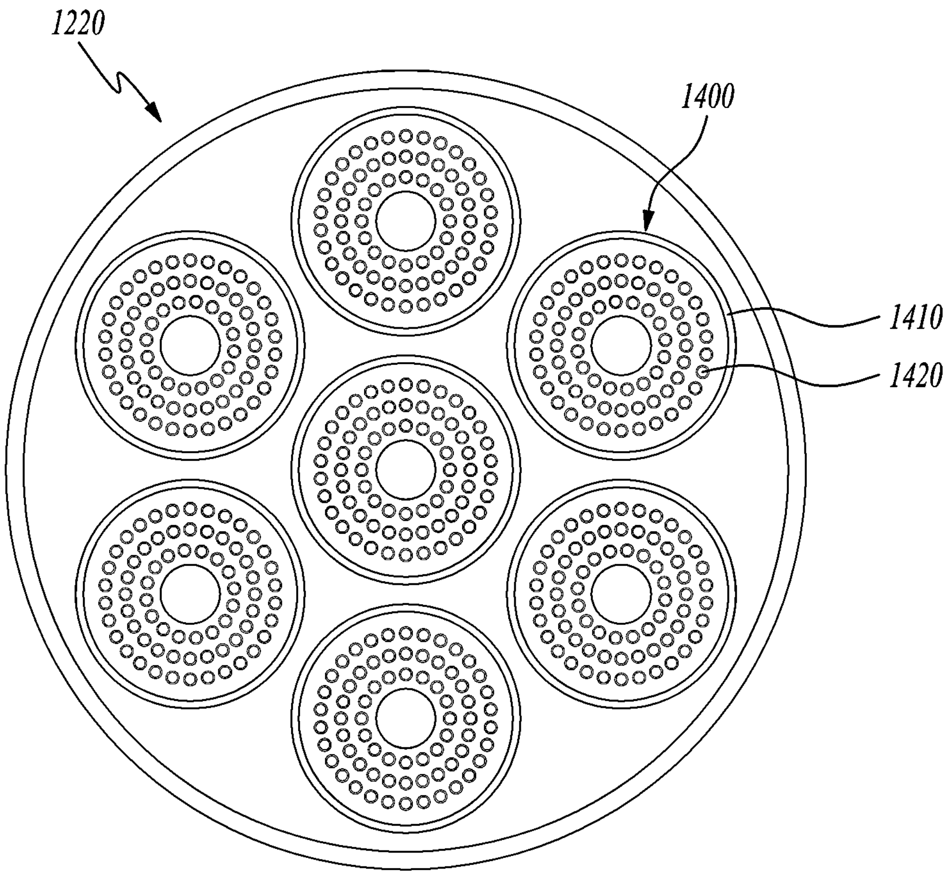
FIG. 3 is a front diagram illustrating a burner according to the first embodiment of the present disclosure.
Figure 4:
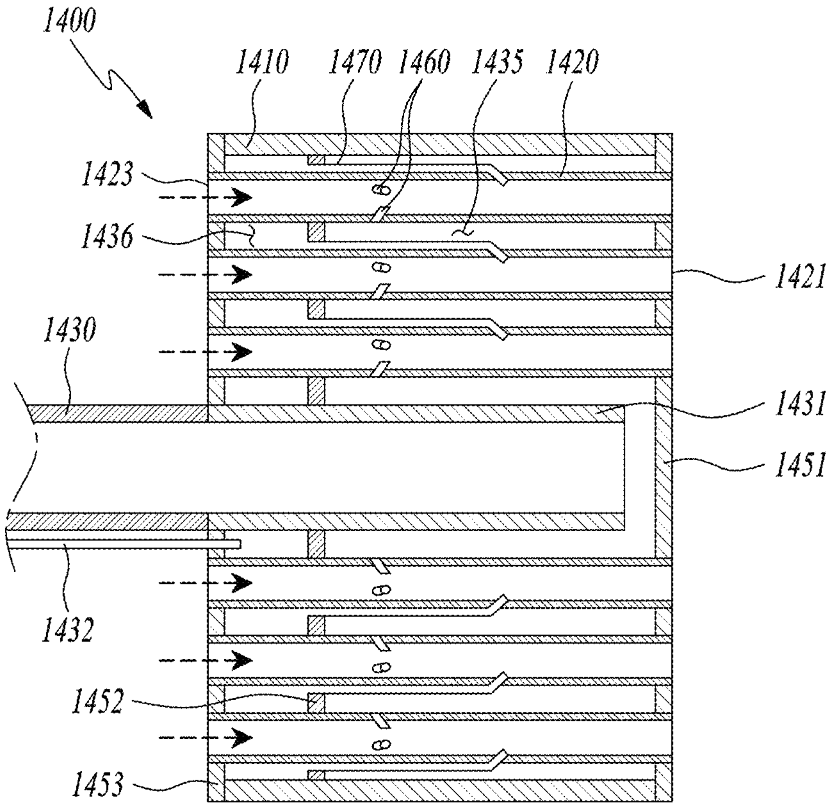
FIG. 4 is a longitudinal cross-sectional diagram illustrating a nozzle according to the first embodiment of the present disclosure.
Figure 5:
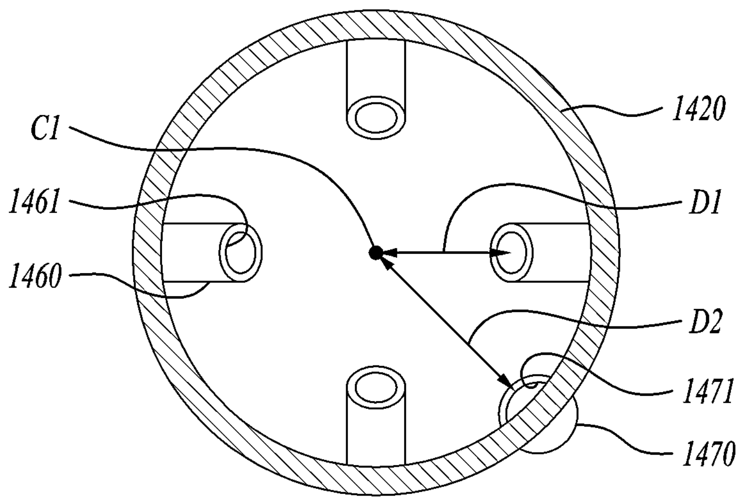
FIG. 5 is a radial cross-sectional diagram illustrating a mixing tube according to the first embodiment of the present disclosure.

FIG. 3 is a front diagram illustrating a burner according to the first embodiment of the present disclosure, FIG. 4 is a longitudinal cross-sectional diagram illustrating a nozzle according to the first embodiment of the present disclosure, and FIG. 5 is a radial cross-sectional diagram illustrating a mixing tube according to the first embodiment of the present disclosure.

Referring to FIGS. 3 to 5, the nozzle 1400 may include a plurality of mixing tubes 1420 through which air and fuel flow, an accommodation tube 1410 accommodating the plurality of mixing tubes 1420, first and second fuel tubes 1431 and 1432 installed inside the accommodation tube 1410, a tip plate 1451 coupled to a leading end (i.e., downstream end or forward end) of the accommodation tube 1410, a rear plate 1453, and a middle plate 1452 spaced apart from the tip plate 1451.

The accommodation tube 1410 is cylindrical in shape. Together with the tip plate 1451 located at the leading end and the rear plate 1453 located at a rear end (i.e., upstream end), the accommodation tube 1410 forms a cavity therein. The nozzle 1400 may further include a fuel supply tube 1430 that supplies a first fuel to the accommodation tube 1410. Here, the first fuel may include a hydrogen-based fuel having hydrogen as a major component or a hydrocarbon-based fuel having hydrocarbon as a major component. The first fuel may also include a mixture of a hydrogen-based fuel and a hydrocarbon-based fuel.

As used herein, the hydrogen-based fuel means a fuel having a concentration of at least 70 wt % hydrogen, and the hydrocarbon-based fuel means a fuel having a concentration of at least 70 wt % hydrocarbon. The hydrocarbon-based fuel may include natural gas or the like.

The first fuel tube 1431 is disposed at the radial center of the accommodation tube 1410 to provide a space for the first fuel to flow. A first longitudinal end (i.e., an upstream end) of the first fuel tube 1431 is connected to the fuel supply tube 1430 to receive fuel, and a second longitudinal end (i.e., a downstream end) of the first fuel tube 1431 is connected to a first distribution space 1435 to supply fuel to the first distribution space 1435. That is, the second longitudinal end of the first fuel tube 1431 is positioned within the first distribution space 1435. The first fuel tube 1431 may extend from a downstream end of the fuel supply tube 1430 maintaining the same outer and inner diameter.

Throughout the specification, the central axis of the fuel supply tube 1430, the first fuel tube 1431 and the accommodation tube 1410 may be concentric and may be referred to as a nozzle central axis. Along the nozzle central axis, the downstream side, the leading side, the front side means a direction from the rear plate 1453 toward the tip plate 1451 and the upstream side, the trailing side, the rear side means a direction from the tip plate 1451 toward the rear plate 1453.

The tip plate 1451 is coupled to the leading end of the accommodation tube 1410 to define the first distribution space 1435. Leading ends of the mixing tubes 1420 may be inserted into and coupled with the tip plate 1451.

The middle plate 1452 is spaced from the tip plate 1451 toward the rear (toward upstream side) of the accommodation tube 1410 and coupled to the accommodation tube 1410. The middle plate 1452 may be positioned further rearward (upstream) than the longitudinal center of the accommodation tube 1410. The first distribution space 1435 is defined as a space between the middle plate 1452 and the tip plate 1451. The second distribution space 1436 is defined as a space between the middle plate 1452 and the rear plate 1453. In other words, the middle plate 1452 splits the cavity defined by the accommodation tube 1410 into two space—the first distribution space 1435 and the second distribution space 1436. The fuel supplied from the first fuel tube 1431 may be dispersed in the first distribution space 1435 and supplied to the mixing tubes 1420.

The rear plate 1453 is secured to the rear end (upstream side) of the accommodation tube 1410 to define a second distribution space 1436 with the middle plate 1452. The second distribution space 1436 has a smaller volume than the first distribution space 1435. In other words, the middle plate 1452 is located relatively closer to the rear plate 1453 than the tip plate 1451.

The second fuel tube 1432 may be radially spaced apart from the first fuel tube 1431 and is connected to the second distribution space 1436 to supply a second fuel to the second distribution space 1436. In other words, a downstream end of the second fuel tube, through which the second fuel is discharged, is positioned within the second distribution space 1436. Here, the second fuel may include a hydrocarbon-based fuel having hydrocarbon as a major component, in particular natural gas.

A longitudinal axis of the second fuel tube 1432 may be radially spaced apart from and in parallel to the nozzle central axis. The second fuel tube 1432 may be positioned such that an outer surface of the second fuel tube 1432 is radially spaced apart from an outer surface of the first fuel tube 1431 or attached and adjacent to the outer surface of the first fuel tube 1431.

Each mixing tube 1420 is formed to extend through the rear plate 1453, the middle plate 1452, and the tip plate 1451. At the leading end of the mixing tube 1420, an outlet 1421 may be formed for fuel and air to exit, and at the trailing end (i.e., upstream end) of the mixing tube 1420, an inlet 1423 may be formed for air to enter.

The plurality of mixing tubes 1420 are distributed inside the accommodation tube 1410 to accommodate and mix fuel (i.e., the first fuel and the second fuel) and air and inject the fuel-air mixture into the combustion space. The mixing tube 1420 is formed with a circular tube with a relatively smaller diameter to allow the fuel and air to be injected at high speed.

The mixing tube 1420 may be provided with a first fuel supply member 1460 that supplies a first fuel into the mixing tube 1420 and a second fuel supply member 1470 that supplies a second fuel into the mixing tube 1420.

The first fuel supply member 1460 may be formed on a tubular wall of the mixing tube 1420 and is connected to the first distribution space 1435 to receive the first fuel from the first distribution space 1435 into the mixing tube 1420. The first fuel supply member 1460 may be in a tubular shape extending from a hole on a tubular wall of the mixing tube and may slope (i.e., be inclined) from the hole forward (i.e., downstream) with respect to a radial direction of the mixing tube 1420 and protrude into the mixing tube 1420. A distal end of first fuel supply member 1460 may be positioned inside the inner space of the mixing tube 1420. However, the present disclosure is not limited thereto, and the first fuel supply member 1460 may simply include a hole formed in the mixing tube 1420, or may include a fuel injecting vane. The first fuel supply member 1460 may be located at a position relatively more forward than the middle plate 1452.

The second fuel supply member 1470 may be in a tubular shape and is connected to the second distribution space 1436 to receive the second fuel from the second distribution space 1436 into the mixing tube 1420. The second fuel supply member 1470 extends from the second distribution space 1436 into the first distribution space 1435 and is inserted at its leading end into the mixing tube 1420.

A rear end of the second fuel supply member 1470 may be coupled with the middle plate 1452 and have an inlet to receive the second fuel from the second distribution space 1436. An external surface of the second fuel supply member 1470 may be attached and adjacent to an external surface of the mixing tube 1420. At a front end of the second fuel supply member 1470 may be bent toward inside of the mixing tube 1420 and is installed through a hole on the tubular wall of the mixing tube such that the second fuel provided through the second fuel supply member 1470 is supplied inside the mixing tube 1420.

The holes on the mixing tube 1420 for the second fuel supply member 1470 may be located more front side than the holes on the mixing tube 4120 for the first fuel supply member 1460.

The center of the outlet 1461 of the first fuel supply member 1460 may be spaced a first distance D1 from the center C1 of the mixing tube 1420, and the center of the outlet 1471 of the second fuel supply member 1470 may be spaced a second distance D2 from the center C1 of the mixing tube 1420. Here, the first distance D1 may be smaller than the second distance D2.

Accordingly, the outlet 1461 of the first fuel supply member 1460 is disposed closer to the center C1 of the mixing tube 1420 than the outlet 1471 of the second fuel supply member 1470, such that the first fuel may be injected relatively toward the center portion of the mixing tube 1420 and the second fuel may be injected relatively close to the wall surface of the mixing tube 1420. The first fuel is uniformly distributed inside the mixing tube 1420 and mixed with air to form a uniform fuel flow 1426 as illustrated in FIG. 8.

Figure 8:
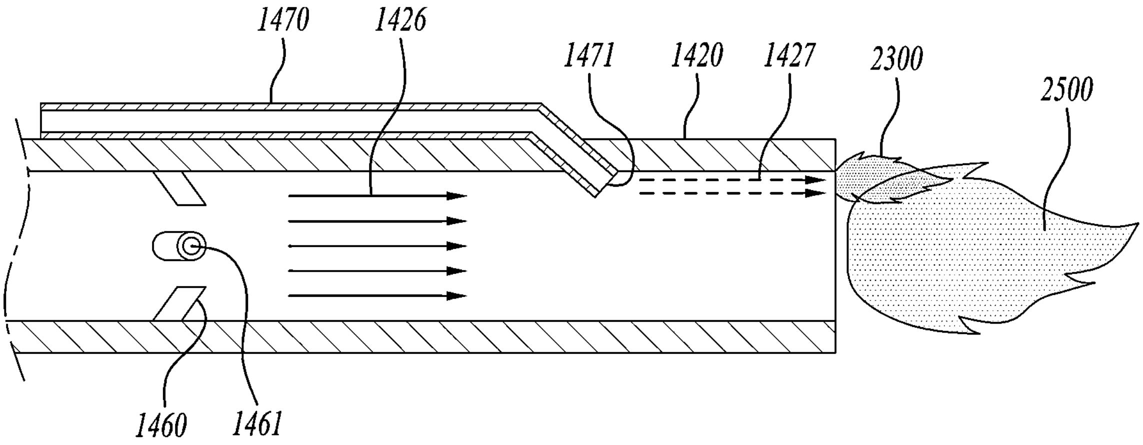
FIG. 8 is a diagram illustrating a flame formed by the mixing tube according to the first embodiment of the present disclosure.

The second fuel supply member 1470 may inject the second fuel at a location adjacent to the inner circumferential wall surface of the mixing tube 1420 to form a concentrated fuel flow 1427 (as illustrated in FIG. 8) flowing along the inner circumferential wall of the mixing tube 1420. Thus, the second fuel may be concentrated and flows along the inner circumferential wall of the mixing tube 1420 without being dispersed. Further, the outlet 1471 of the second fuel supply member 1470 may be located further downstream of the outlet 1461 of the first fuel supply member 1460, such that the first fuel may be injected from the upstream side and mixed uniformly with air in the mixing tube 1420, while the second fuel may be injected toward the downstream side of the mixing tube 1420 and discharged in a concentrated state without being mixed with air.

Figure 6:
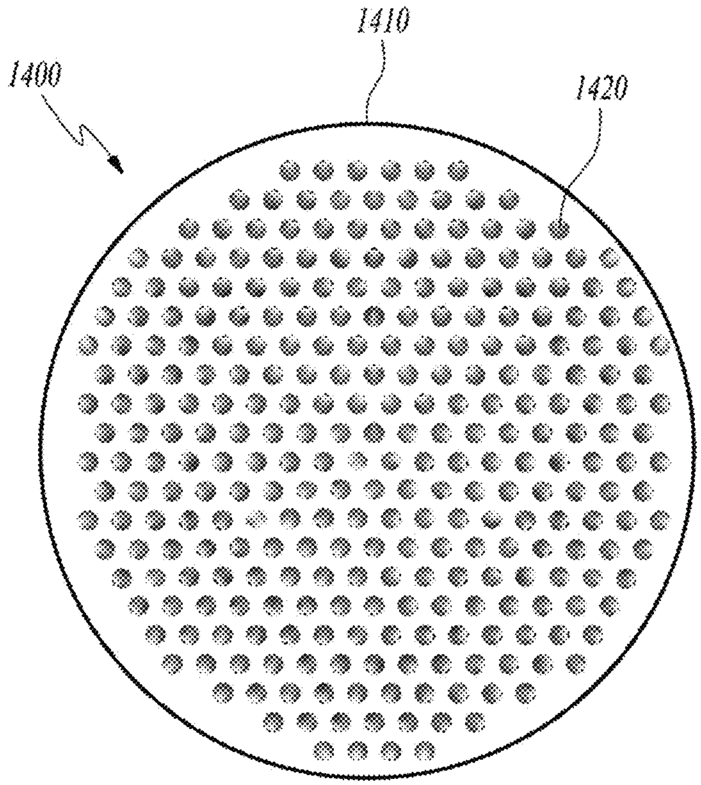
FIG. 6 is a diagram illustrating the concentration of fuel injected from an outlet of the nozzle according to the first embodiment of the present disclosure.
Figure 7:
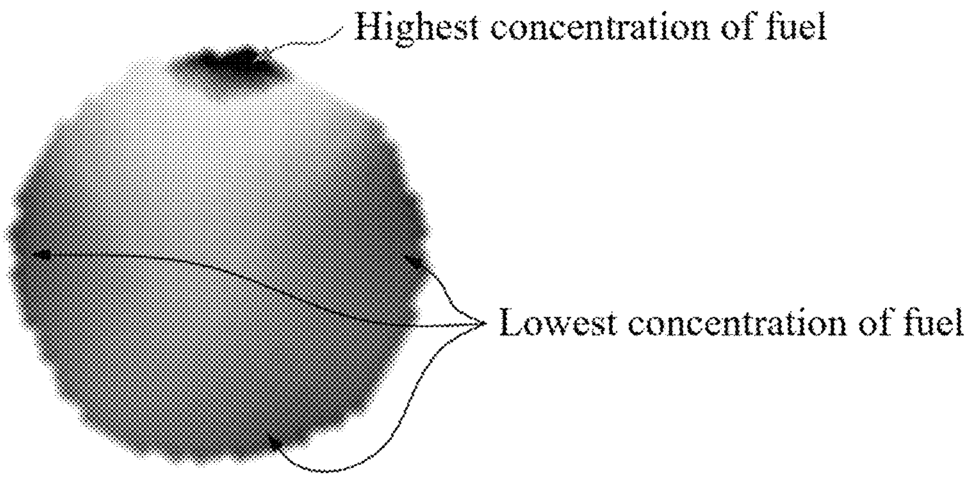
FIG. 7 is a diagram illustrating the concentration of fuel injected from one of the mixing tubes.

FIG. 6 is a diagram illustrating the concentration of fuel injected from an outlet of the nozzle according to the first embodiment of the present disclosure, FIG. 7 is a diagram illustrating the concentration of fuel injected from one of the mixing tubes, and FIG. 8 is a diagram illustrating a flame formed by the mixing tube according to the first embodiment of the present disclosure.

Referring to FIGS. 6 to 8, when the second fuel is injected into the mixing tube 1420 through the second fuel supply member 1470, a locally concentrated area of fuel is formed at the portion of the outlet 1421 of the mixing tube 1420 adjacent to the inner circumferential wall due to the concentrated fuel flow 1427, as illustrated in FIGS. 6 and 7. In FIG. 7, the dark areas at the left side, right side, and the bottom side are the areas with the lowest concentration of fuel while the darkest area at the top is the area with the highest concentration of fuel. Specifically, in FIG. 7, the concentration area at the top of the mixing tube is area where the second fuel provided from the second fuel supply tube 1470 is concentrated.

As illustrated in FIG. 8, if the first fuel is a hydrocarbon-based fuel such as natural gas, due to a lower combustion rate of the hydrocarbon-based fuel than hydrogen, a main flame 2500 may delaminate at the outlet of the nozzle. However, when a locally concentrated area of fuel is formed due to the concentrated fuel flow 1427, a secondary flame 2300 may be formed by the second fuel to anchor the main flame 2500 to the nozzle, preventing the flame from blowing away and maintaining a stable flame.

The first fuel may include hydrogen, natural gas, or a mixture of hydrogen and natural gas. If the first fuel is hydrogen, the second fuel may not be supplied through the second fuel supply member 1470 because the flame may remain stable even when the second fuel is not supplied. However, if the first fuel is a mixture of hydrogen and natural gas or a natural gas fuel, the second fuel needs to be supplied through the second fuel supply member 1470 to maintain a stable flame.

As described above, the present embodiment enables mixing and combustion of hydrocarbon-based fuel such as natural gas in the nozzle designed for combustion of hydrogen, and the flame is maintained by the second fuel regardless of the flow rate of the first fuel, so that the flow rate of the first fuel may be controlled to easily control occurrence of vibration and generation of carbon monoxide and nitrogen oxide.

Hereinafter, a nozzle according to a second embodiment of the present disclosure will be described.

Figure 9:
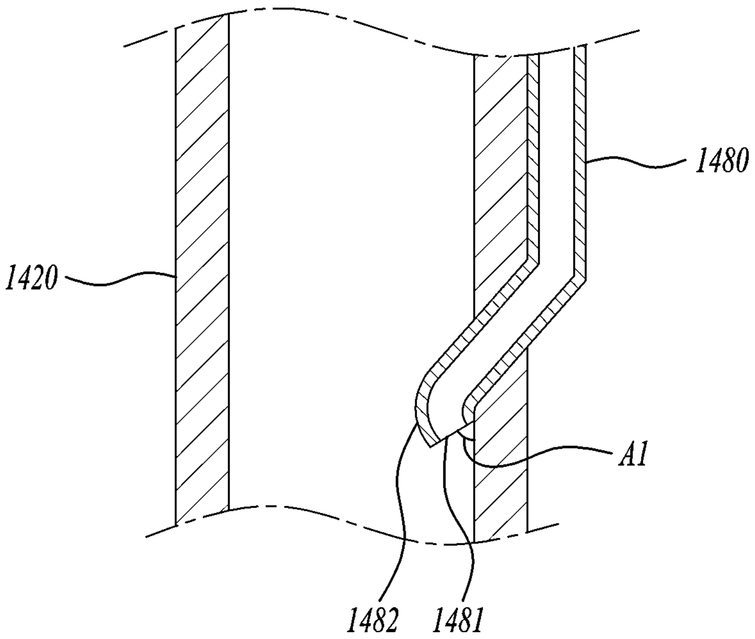
FIG. 9 is a longitudinal cross-sectional diagram illustrating a mixing tube according to a second embodiment of the present disclosure.

FIG. 9 is a longitudinal cross-sectional diagram illustrating a mixing tube according to a second embodiment of the present disclosure.

Referring to FIG. 9, the nozzle according to the second embodiment has the same structure as the nozzle according to the first embodiment described above, except for a second fuel supply member 1480, so a repeated description of the same configuration will be omitted.

The second fuel supply member 1480 is installed inside an accommodation tube 1410 and is connected to a second distribution space 1436 at its rear end to receive the second fuel from the second distribution space 1436 and inject the same into the mixing tube 1420. The second fuel supply member 1480 is tubular in shape, extending from the second distribution space 1436 into a first distribution space 1435 and inserted at its leading end into the mixing tube 1420.

At the leading end of the second fuel supply member 1480, a guide portion 1482 is formed for injecting the second fuel toward an inner circumferential wall of the mixing tube 1420. The guide portion 1482 is curved in an arc or inclined toward the inner circumferential wall of the mixing tube 1420 so as to induce the second fuel to form a flow toward the inner circumferential wall of the mixing tube 1420.

That is, in a first portion of the second supply member 1480, a virtual center line of the first portion is a straight line parallel with the mixing tube 1420. Then, in a second portion of the second supply member 1480, the second supply member 1480 is bent and extended from a front end of the first portion to an inside of the mixing tube 1420 and installed through a hole on the tubular wall of the mixing tube. A front end of the second portion may be located inside of the mixing tube 1420. In the second portion, the virtual center line of the second supply member 1480 may be a straight line inclined relative to the mixing tube 1420. Then, in the third portion of the second supply member 1480, which extends from the front end of the second portion, is formed to be bent in an arc shape. The third portion may be bent such that a virtual center line of the third portion extends to the front side and toward the center of the mixing tube and then extends to the front side and toward the inner surface of the mixing tube 1420.

Accordingly, a virtual plane forming an outlet 1481 of the second fuel supply member 1480 is formed to be inclined at a first inclination angle A1 with respect to the inner circumferential wall of the mixing tube 1420, wherein the first inclination angle A1 may be an acute angle. Preferably, first inclination angle A1 may range from 30 degrees to 80 degrees.

When the guide portion 1482 is formed on the second fuel supply member 1480 as in the second embodiment, the second fuel is injected toward the inner circumferential wall of the mixing tube 1420, so that a flow of the second fuel may be in closer contact with the inner circumferential surface of the mixing tube 1420 to form a more concentrated flow of fuel flowing along the inner circumferential surface.

The following describes a nozzle according to a third embodiment of the present disclosure.

Figure 10:
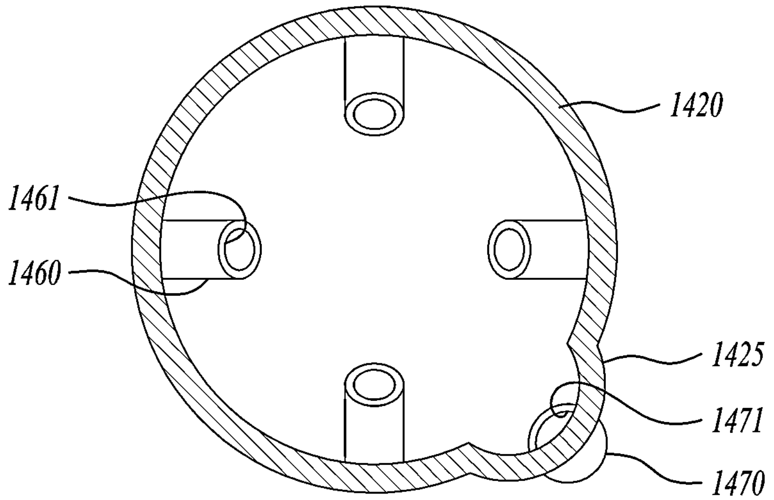
FIG. 10 is a radial cross-sectional diagram illustrating a mixing tube according to a third embodiment of the present disclosure.
Figure 11:
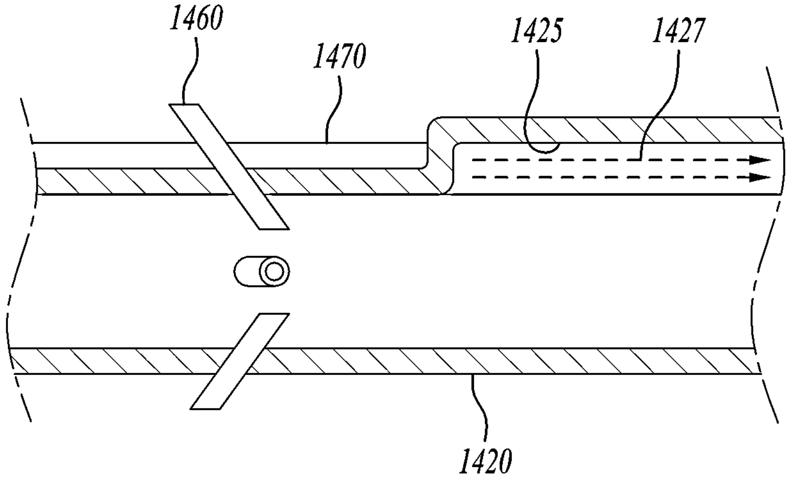
FIG. 11 is a longitudinal cross-sectional diagram illustrating the mixing tube according to the third embodiment of the present disclosure.

FIG. 10 is a radial cross-sectional diagram illustrating a mixing tube according to a third embodiment of the present disclosure, and FIG. 11 is a longitudinal cross-sectional diagram illustrating the mixing tube according to the third embodiment of the present disclosure.

Referring to FIGS. 10 and 11, the nozzle according to the third embodiment has the same structure as the nozzle according to the first embodiment described above, except for a mixing tube, so a repeated description of the same configuration will be omitted.

The plurality of mixing tubes 1420 are disposed inside the accommodation tube, and accommodate and mix fuel and air and inject the fuel-air mixture into the combustion space. The mixing tube 1420 is tubular in shape and has an auxiliary groove 1425 extending along the longitudinal direction of the mixing tube 1420. The auxiliary groove 1425 extends from a connection between the second fuel supply member 1470 and the mixing tube 1420 toward the leading end of the mixing tube 1420. The outlet 1471 of the second fuel supply member 1470 is inserted into the auxiliary groove 1425 to supply the second fuel into the auxiliary groove 1425. The second fuel is concentrated in the auxiliary groove 1425, so a concentrated fuel flow 1427 may be formed inside the auxiliary groove 1425 and flow along the inner circumferential wall of the mixing tube 1420. However, the second fuel may flow from the outside as well as inside the auxiliary groove 1425.

As noted above, according to the present embodiment, the auxiliary groove 1425 is formed in the mixing tube 1420 so that the second fuel is concentrated inside the auxiliary groove 1425 to easily form the concentrated fuel flow 1427.

While the embodiments of the present disclosure have been described, it will be apparent to those skilled in the art that various modifications and variations can be made in the present disclosure through addition, change, omission, or substitution of components without departing from the spirit of the present disclosure as set forth in the appended claims, and such modifications and changes may also be included within the scope of the present disclosure. Also, it is noted that any one feature of an embodiment of the present disclosure described in the specification may be applied to another embodiment of the present disclosure. Similarly, the present invention encompasses any embodiment that combines features of one embodiment and features of another embodiment.

The invention claimed is:

1. A combustor nozzle comprising:

a plurality of mixing tubes, extending in an axial direction, through which air and fuel flow;

an accommodation tube accommodating and supporting the plurality of mixing tubes therein;

a first fuel tube coupled to the accommodation tube to supply a first fuel into the accommodation tube;

a second fuel tube coupled to the accommodation tube to supply a second fuel into the accommodation tube;

a plurality of first fuel supply members supplying the first fuel into the plurality of mixing tubes; and a plurality of second fuel supply members supplying the second fuel into the plurality of mixing tubes, each second fuel supply member having a rear end configured to receive the second fuel supplied from the second fuel tube and a leading end coupled with a hole formed on a corresponding mixing tube from among the plurality of mixing tubes to discharge the second fuel into the corresponding mixing tube, wherein each of the plurality of second fuel supply members is provided with a guide portion for injecting the second fuel toward a wall portion of an inner circumferential wall of the corresponding mixing tube, the wall portion being axially aligned with and located directly downstream of the hole formed on the corresponding mixing tube, and the guide portion is curved in an arc or inclined toward the wall portion of the inner circumferential wall such that an outlet of each second fuel supply member is open toward the wall portion of the inner circumferential wall, wherein a virtual plane forming the outlet of each second fuel supply member is formed to be inclined at a first inclination angle with respect to the inner circumferential wall of the corresponding mixing tube located downstream of the outlet, and the first inclination angle ranges from 30 degrees to 80 degrees so as to inject the second fuel toward the wall portion of the inner circumferential wall of the corresponding mixing tube.

2. The combustor nozzle according to claim 1, further comprising:

a tip plate coupled to a leading end of each accommodation tube;

a middle plate spaced apart from the tip plate to define a first distribution space between the tip plate and the middle plate in which the first fuel is accommodated; and a rear plate spaced apart from the middle plate to define a second distribution space between the rear plate and the middle plate in which the second fuel is accommodated.

3. The combustor nozzle according to claim 2, wherein each first fuel supply member is connected to the first distribution space, and each second fuel supply member is connected to the second distribution space.

4. The combustor nozzle according to claim 3, wherein an outlet of each first fuel supply member is disposed closer to the center of the mixing tube than the outlet of each second fuel supply member.

5. The combustor nozzle according to claim 3, wherein the outlet of each second fuel supply member is located further downstream of the outlet of each first fuel supply member.

6. The combustor nozzle according to claim 3, wherein each second fuel supply member extends from the second distribution space into the first distribution space and then into the corresponding mixing tube.

7. The combustor nozzle according to claim 3, wherein each second fuel supply member forms a concentrated fuel flow along the inner circumferential wall of the corresponding mixing tube.

8. The combustor nozzle according to claim 3, wherein the first fuel comprises a hydrogen-based fuel having hydrogen as a major component or a hydrocarbon-based fuel having hydrocarbon as a major component, and the second fuel comprises a hydrocarbon-based fuel having hydrocarbon as a major component.

9. A combustor comprising:
a burner having a plurality of nozzles through which fuel and air are injected; and
a duct assembly coupled to one side of the burner to allow the fuel and the air to be combusted therein and combustion gases to be transferred to a turbine, wherein each nozzle of the plurality of nozzles comprises:
a plurality of mixing tubes, extending in an axial direction, through which air and fuel flow;
an accommodation tube accommodating and supporting the plurality of mixing tubes therein;
a first fuel tube coupled to the accommodation tube to supply a first fuel into the accommodation tube;
a second fuel tube coupled to the accommodation tube to supply a second fuel into the accommodation tube;
a plurality of first fuel supply members supplying the first fuel into the plurality of mixing tubes; and
a plurality of second fuel supply members supplying the second fuel into the plurality of mixing tubes, each second fuel supply member having a rear end configured to receive the second fuel supplied from the second fuel tube and a leading end coupled with a hole formed on a corresponding mixing tube from among the plurality of mixing tubes to discharge the second fuel into the corresponding mixing tube,
wherein each second fuel supply member is provided with a guide portion for injecting the second fuel toward a wall portion of an inner circumferential wall of the corresponding mixing tube, the wall portion being axially aligned with and located directly downstream of the hole formed on the corresponding mixing tube, and the guide portion is curved in an arc or inclined toward the wall portion of the inner circumferential wall such that an outlet of each second fuel supply member is open toward the wall portion of the inner circumferential wall,
wherein a virtual plane forming the outlet of each second fuel supply member is formed to be inclined at a first inclination angle with respect to the inner circumferential wall of the corresponding mixing tube located downstream of the outlet, and the first inclination angle ranges from 30 degrees to 80 degrees so as to inject the second fuel toward the wall portion of the inner circumferential wall of the corresponding mixing tube.

10. The combustor according to claim 9, further comprising:
a tip plate coupled to a leading end of each accommodation tube;
a middle plate spaced apart from the tip plate to define a first distribution space between the tip plate and the middle plate in which the first fuel is accommodated; and
a rear plate spaced apart from the middle plate to define a second distribution space between the rear plate and the middle plate in which the second fuel is accommodated.

11. The combustor according to claim 10, wherein each first fuel supply member is connected to the first distribution space, and the second fuel supply member is connected to each second distribution space.

12. The combustor according to claim 11, wherein an outlet of each first fuel supply member is disposed closer to the center of the corresponding mixing tube than the outlet of the second fuel supply member, and the outlet of each second fuel supply member is located further downstream of the outlet of the first fuel supply member.

13. The combustor according to claim 11, wherein each second fuel supply member extends from the second distribution space into the first distribution space and then into the corresponding mixing tube.

14. The combustor according to claim 11, wherein each second fuel supply member forms a concentrated fuel flow along the inner circumferential wall of the corresponding mixing tube.

15. The combustor according to claim 11, wherein the first fuel comprises a hydrogen-based fuel having hydrogen as a major component or a hydrocarbon-based fuel having hydrocarbon as a major component, and the second fuel comprises a hydrocarbon-based fuel having hydrocarbon as a major component.

16. A gas turbine comprising:
a compressor compressing an externally introduced air;
a combustor mixing the compressed air from the compressor with fuel to produce a mixture and combusting the mixture; and
a turbine having a plurality of turbine blades rotated by the combustion gases from the combustor, wherein the combustor comprises:
a burner having a plurality of nozzles through which fuel and air are injected; and
a duct assembly coupled to one side of the burner to allow the fuel and the air to be combusted therein and combustion gases to be transferred to a turbine, wherein each nozzle of the plurality of nozzles includes:
a plurality of mixing tubes, extending in an axial direction, through which air and fuel flow;
an accommodation tube accommodating and supporting the plurality of mixing tubes therein;
a first fuel tube coupled to accommodation tube to supply a first fuel into the accommodation tube;
a second fuel tube coupled to accommodation tube to supply a second fuel into the accommodation tube;
a plurality of first fuel supply members supplying the first fuel into the plurality of mixing tubes; and
a plurality of second fuel supply members supplying the second fuel into the plurality of mixing tubes, each second fuel supply member having a rear end configured to receive the second fuel supplied from the second fuel tube and a leading end coupled with a hole formed on a corresponding mixing tube from among the plurality of mixing tubes to discharge the second fuel into the corresponding mixing tube,
wherein each second fuel supply member is provided with a guide portion for injecting the second fuel toward a wall portion of an inner circumferential wall of the corresponding mixing tube, the wall portion being axially aligned with and located directly downstream of the hole formed on the corresponding mixing tube, and the guide portion is curved in an arc or inclined toward the wall portion of the inner circumferential wall such that an outlet of each second fuel supply member is open toward the wall portion of the inner circumferential wall,
wherein a virtual plane forming the outlet of each second fuel supply member is formed to be inclined at a first inclination angle with respect to the inner circumferential wall of the corresponding mixing tube located downstream of the outlet, and the first inclination angle ranges from 30 degrees to 80 degrees so as to inject the second fuel toward the wall portion of the inner circumferential wall of the corresponding mixing tube.

* * * * *